UNITED STATES PATENT OFFICE.

JOHN CARNRICK, OF NEW YORK, N. Y.

DIGESTIVE COMPOUND.

SPECIFICATION forming part of Letters Patent No. 412,837, dated October 15, 1889.

Application filed June 22, 1889. Serial No. 315,265. (No specimens.)

*To all whom it may concern:*

Be it known that I, JOHN CARNRICK, a citizen of the United States, residing at New York city, in the county of New York and State of New York, have invented certain new and useful Improvements in Powdered Digestive Compounds; and I do hereby declare the following to be a full, clear, and exact description of the invention, such as will enable others skilled in the art to which it appertains to make and use the same.

This invention relates to a medical compound in dry, powdered form, which may be inclosed in capsules or formed into pills and coated, which compound is adapted particularly for causing the digestion and absorption of fatty matter, to aid in converting starchy matter into an assimilable condition, and to promote the digestion of albuminous substances.

The object of the invention is to provide, in a convenient form, a dry, powdered compound of pancreatine and bile, inclosed in capsules or formed into pills and coated with a substance that will resist the acid action of the fluids of the stomach, but which will be readily dissolved in the alkaline secretions which flow into the intestinal canal.

A further object is to present a digestive compound, in agreeable form, which shall constitute a satisfactory remedy for persons suffering from constipation and wasting diseases, or persons in a debilitated or emaciated condition resulting from overwork, mental strain, or other causes, and which shall have the salutary effect of producing a vigorous, healthy tone of the digestive organs, especially in the alimentary canal, relieving constipation, and causing a rapid increase of fat and flesh in the person using it.

It is known that the pancreatic juice and extracts of pancreas aid materially in the digestion of fats; but it has been ascertained that the pancreatic juice alone will digest but a moderate per cent. of the ordinary amount of fat supplied to the living subject, while the same amount of fat is practically all digested (all but about one per cent.) in subjects in which the secretions of both the pancreas and bile are permitted to act in their normal way.

A high authority recently states, as a result of his investigations, that "separately neither the bile nor pancreatic juice is capable of effecting the complete digestion and absorption of fatty substances, but their mixture is, the pancreatic secretion causing their division and the bile promoting their absorption." The bile and pancreatic juice together act to cause a fine division and complete digestion of fatty substances and promote their assimilation. The pancreatic extract digests about forty per cent. of fat, while the prepared bile digests about sixty per cent. of fat when they are administered together in suitable quantity. It has also been ascertained by experimental research that bile possesses a well-marked anti-fermentative property.

The established properties and beneficial action of the bile indicate that it is an important remedial agent when properly combined and administered.

The compound of pancreatine and bile, as prepared in accordance with my invention, not only causes the digestion and absorption of fats, but materially aids in the digestion of albuminous substances, and also serves to convert starchy matter into an assimilable condition.

My digestive compound, being a mixture of pancreatine and bile, I have, for convenience, named "pancrobilin." In order to prepare it, the fresh sweet-breads, (pancreas,) in suitable quantity, are first carefully dressed by removing with a knife all the adhering fat. They are then chopped fine in a chopping-machine, and the finely-comminuted mass is then digested in alcohol of ninety-five per cent. strength, in the proportion of about forty-five pounds of pancreas to three gallons of alcohol, for a period of about ten hours, for the purpose of loosening, softening, and partially dissolving the fatty matter entangled in its tissue, preparatory to its removal. The alcohol also prevents pancreatic digestion of the fatty matter contained in the parenchyma during manipulation of the raw material. The period of maceration having been completed, the mass of pancreas is well pressed, to squeeze out the moisture and fat, after which it is carefully dried in the drying-chamber. When well dried, it is reduced to a fine powder, preferably in a roller-mill. It is quite important to remove the fatty matter entangled in the parenchyma of the pancreas, as above described, in order to present the digestive principle in the most active and favorable condition. This dried powder prepared from the pancreas, as above described, constitutes my pancreatine, and is in proper condition to mix with powdered bile and a suitable excipient to form pills. Two and a half ounces of dry, powdered pancreatine represents the substance of twenty-five fresh sweet-breads.

In order to prepare the bile for use in my compound, it is first removed from the gall-sack and then mixed with a suitable proportion of alcohol and allowed to stand about twenty-four hours for the mucus and other impurities to settle, after which the liquid is decanted. This liquid is then filtered through animal or wood charcoal, to further purify it, after which it is evaporated to dryness. This purified bile may be used directly in the dry, powdered condition in the manufacture of pills. The powdered pancreatine and dry, powdered bile are thoroughly mixed together, in about equal proportions. The mixed powder may then be filled into capsules of suitable material and of convenient size for administration. Preferably, however, the powder is mixed with a suitable excipient—as, for instance, powdered sugar of milk and gum-arabic—and formed into pills containing about one grain each of the powdered pancreatine and bile. These pills are then coated with an etherial solution of gum-sandarac, and then, while slightly moist, dusted with keratin. This coating, when dry, resists the acid action of the fluids of the stomach, but is readily dissolved in the alkaline secretions which flow into the intestinal canal. Since it is intended that the pancrobilin powder shall exert its digestive action mostly in the intestines, to digest fatty and albuminous substances, it is evidently important to provide the pills with an acid-resisting coating, so that they may pass through the stomach and into the duodenum before the pancrobilin is released and permitted to exert its digestive action. The pills are preferably administered in doses of two to four, two or three hours after meals.

Having described my invention, what I claim, and desire to secure by Letters Patent, is—

1. A dry digestive compound composed of powdered pancreatine and powdered bile.

2. A powdered digestive compound adapted to cause the digestion of fats, albuminous substances, and starchy matter, composed of powdered pancreatine and bile and inclosed in capsules or formed into pills, and having a coating adapted to resist the acid action of fluids in the stomach.

3. A digestive ferment compound adapted to cause the digestion and absorption of fatty matter and albuminous substances, and to convert starchy matter into an assimilable condition, coated with a substance that will resist the acid action of the stomach-fluids, but which will be readily dissolved in the alkaline secretions which flow into the intestinal canal.

In testimony whereof I affix my signature in presence of two witnesses.

JOHN CARNRICK.

Witnesses:
WM. F. MCPHERSON,
ALLEN CHAMBERLIN.